United States Patent [19]

Stonich

[11] 3,963,889

[45] June 15, 1976

[54] LOW VELOCITY FLOW SWITCH

[75] Inventor: Elwood Harold Stonich, Chicago, Ill.

[73] Assignee: International Telephone and Telegraph Corporation, New York, N.Y.

[22] Filed: July 30, 1974

[21] Appl. No.: 493,039

[52] U.S. Cl. .............................. 200/81.9 R; 73/228; 200/83 J

[51] Int. Cl.$^2$ .............................. H01M 35/40

[58] Field of Search .............................. 340/239 R, 240; 73/194 E, 228; 74/18.1; 200/81.9 R, 82 R, 82 C, 83 C, 83 J, 83 S, 83 W, 153 T, 262, 339

[56] References Cited

UNITED STATES PATENTS

| | | | |
|---|---|---|---|
| 2,001,168 | 5/1935 | Turner | 200/81.9 R |
| 2,952,753 | 9/1960 | Kmiecik et al. | 200/81.9 R |
| 3,126,463 | 3/1964 | Kmiecik | 200/81.9 R |
| 3,226,505 | 12/1965 | Lucas | 200/81.9 R |
| 3,290,472 | 12/1966 | Savage | 200/262 |
| 3,393,563 | 7/1968 | Gelinas | 73/228 |
| 3,452,169 | 6/1969 | Ruxton | 200/81.9 R |
| 3,729,604 | 4/1973 | Groff | 200/81.9 R |
| 3,845,259 | 10/1974 | Spurr | 200/81.9 R |

*Primary Examiner*—Gerald P. Tolin
*Attorney, Agent, or Firm*—J. B. Raden; D. P. Warner

[57] ABSTRACT

In a flow switch provided for connection in a fluid pipeline, a metering piston or other flow sensor is provided for placement in a pipe in the path of fluid flow. Fluid pressure above a certain minimum will cause the sensor to move, permitting fluid flow and moving the end of a pivot arm. The pivot arm transmits motion, through a flexible rubber-on-dacron seal, to a mechanical linkage which operates an electric switch. Means are provided to adjust the pressure response of the flow sensor and to vary the travel distance of an actuating plunger relative to the electric switch. Improved bearing means are provided for transferring motion between the pivot arm and the mechanical linkage.

7 Claims, 17 Drawing Figures

LOW VELOCITY FLOW SWITCH

CROSS REFERENCE TO RELATED ART

Attention is directed to U.S. Pat. Nos. 2,952,753 and 3,126,463, covering related subject matter, which issued on Sept. 13, 1960 and Mar. 24, 1964, respectively. Attention is also directed to the related U.S. Pat. application No. 322,967, filed in the name of E.H. Stonich on Jan. 12, 1973.

BACKGROUND OF THE INVENTION

1. Field of the Invention

The present invention relates to flow switches and particularly to an improved switch assembly which has two operating states reflecting whether liquid is flowing or not.

2. Description of the Prior Art

The closest known prior art is disclosed in the above identified cross references. The present invention forms an improvement over that prior art.

The apparatus disclosed in the patents relate to control of pumps, burners, alarms, meters, or similar devices where the flow of liquid in a pipe is of critical significance. Some of the more common fields of application are found in the starting or stopping of a burner in commercial water heaters, the control of a compressor in an air circulation system, the energization of a standby pump upon failure of a primary pump, or with a flow indicator in liquid process systems and the like.

The prior art switches disclosed in the patents were adapted to be fitted in a T-connection associated with a horizontal pipeline where a horizontal run of liquid was encountered. Paddle means were embodied therein for moving an actuation arm which pivoted about an axis located exteriorly of the pipeline and sealed therefrom by a flexible metal bellows. The actuating arm carried a suitable finger portion at its upper end for engaging the plunger of an electrical control switch and could be arranged to maintain the switch contacts open or closed in response to the flow of fluid through the pipeline with which it was associated. Other features included a multi-part paddle system which readily adapted the same to various diameter pipelines and an adjusting system for regulating the throw of the paddle required to operate the switch contacts. Additional means were provided for adjusting the sensitivity of the paddle means to the flow or velocity of fluids in the pipeline.

Shortcomings of this prior art result from the use of a metal bellows which is relatively insensitive to pressure changes. This bellows has been supplanted in embodiments of the present invention by a more flexible membrane, thereby reducing complexities in manufacturing while providing more than an equivalent amount of sealing and providing a more sensitive response to pressure and flow variations.

The copending application referred to above contains a disclosure of an improved flow switch which affords advantages over the patents. However, embodiments of this improved switch have included adjustment means and other means which have increased complexity and cost to a greater degree than has proven to be desirable, or necessary, for use in many applications.

A disadvantage with the embodiments shown in the application, as well as in the patents referred to above, has resulted from the use of particular bearings about which the lever arm turns. These bearings have had a rather rough finish which is inherent in their manufacture and this has resulted in poor wearing qualities attended by poor control of the motion of the lever arm and poor regulation of the switch, particularly after prolonged use and where two or more switches are controlled by a single lever arm.

SUMMARY OF THE INVENTION

Objects of the present invention include the provision of a flow switch which is more sensitive than the prior art devices to changes in the flow of liquids. Additional objects include the provision of a simple flow switch enabling economy in components and in assembly over the prior art. A further object is to provide a flow switch capable of effectively operating a plurality of microswitches. Another object is to provide a simplified bracket having a bearing surface arrangement about which the lever arm of a flow switch may turn. Yet a further object, within the criteria expressed in the last object, is to provide bearings having superior wear characteristics in a flow switch.

A flow switch according to the invention is provided for operation in response to a flow rate which exceeds a preset value. In operation, a metering piston, a paddle, or some other sensor is disposed in a base to extend into the flow path within a pipe. An actuator lever arm, or pendulum arm, is fitted to the piston or other sensor. The lever arm is pivoted on coined bearing surfaces in the housing of the switch in such a way that it is linked to operate an actuator plate in the housing. The actuator plate is pivoted at one end to move in an arc and activate a microswitch capable of routing an electric signal to energize controls, an indicator or an alarm.

An adjustment of the flow switch is effected by an adjustment screw which increases or decreases the compression of a spring to vary the response to pressure on the actuator plate. An alternative embodiment may employ a non-adjustable spring in conjunction with a modified actuator plate.

A flexible seal formed of materials such as a membrane of rubber or dacron is fastened at its periphery between the housing and the base and is sealed at its center to the lever arm. The flexible seal prevents fluid from flowing from the pipe into the housing while permitting the lever to swing about a fulcrum in the housing.

An improved switch bracket and pivot combination in the flow switch assures improvements relating both to simplified construction and to better performance. Bearing surfaces between the bracket are especially smoothed by coining to provide superior wear and support characteristics. To simplify manufacture and provide a superior flow switch, the bracket is fashioned of one piece enabling the one piece to support microswitches and linkages to the microswitches as well as pivots of the lever arm while lending itself to direct attachment to the housing of the flow switch.

BRIEF DESCRIPTION OF THE DRAWINGS

The above mentioned and other features and objects of this invention and the manner of attaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
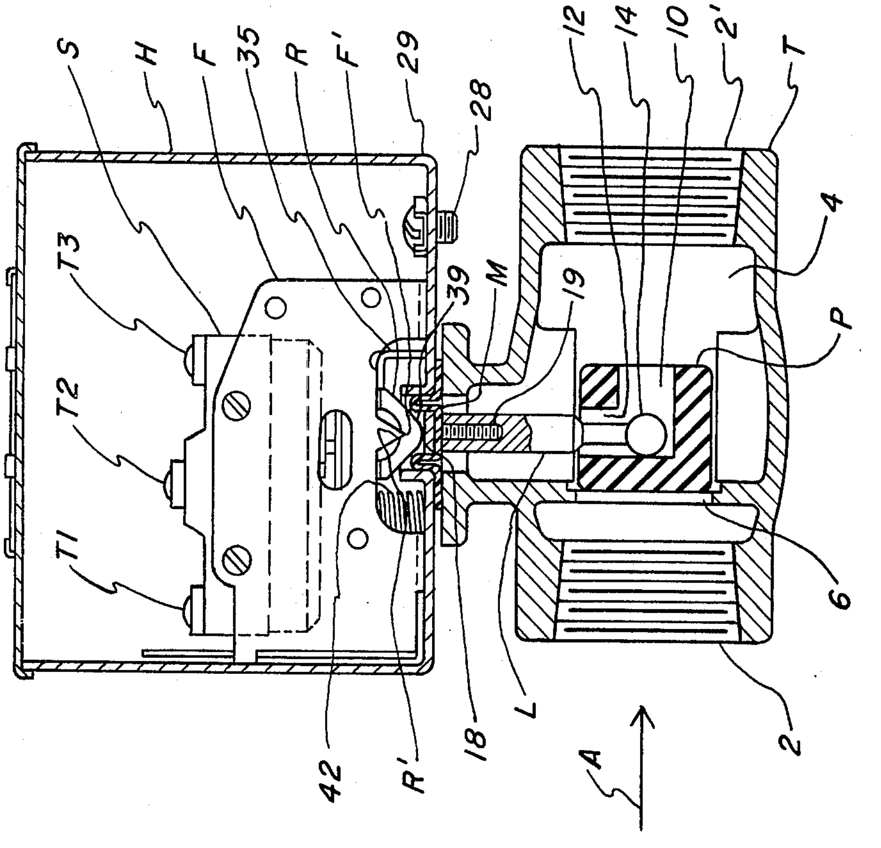
FIG. 1 is a view, partially in section, of a preferred embodiment of the invention.

Turning now to FIG. 1, a view is shown in partial section of an embodiment of a flow switch in accordance with the invention. In this view a T-fitting at T is shown to have threaded portions at 2 – 2′ available to be coupled to a pipe line. The T-fitting includes an internal opening 4 and an annular opening at 6 which provides a seat for a metering piston indicated at P. The piston P in a preferred example is formed of a carbon, or graphite, block and is loosely fitted by openings 10 and 12 to the lower end 14 of a lever arm L. The top of the lever arm L is fastened to an extension at 18 by a threaded portion of the extension at 19.

The use of graphite pistons is preferred over various materials such as those identified by the trademarks "Delrin", "Nylon" and "Teflon" because of water absorption and resulting swelling. Metals were tried for this purpose, but were found to be unsuitable because of corrosion and scale formation. Graphite does not absorb water and withstands the relatively high temperatures and pressures sometimes encountered by flow valves.

A "hat" shaped seal, or bellows, formed from a rubber-on-nylon membrane at M is clamped to prevent fluid leakage between the opening 4 in the T-fitting T and the interior of the instrument housing at H. To provide this seal, the membrane M, which is generally circular in outline and preshaped to resemble a hat is secured at its periphery between the base 29 of the housing H and the top of the T-fitting T through action of bolts 28. Selected bolts 28, as shown most clearly in FIG. 2, pass through the base of a bracket F, and thread into the base 29 of the housing H. The center of the hat-shaped seal M is fastened between the lever arm L and the extension at 18 by means of the threaded portion 19 of the extension 18.

Figure 10:
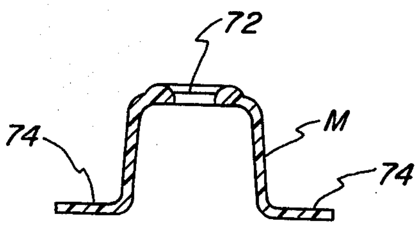
FIG. 10 is a sectional view of a seal used in the practice of the invention.

The bellows M, disclosed more fully in FIG. 10, provides advantages over the metal bellows employed in the patents cited above. The bellows M is very much more sensitive than the metal bellows, permitting the flow switch to react favorably to low velocity flow. At the same time bellows M can be used in systems characterized by very large flows with little pressure drop. The bellows M offers advantages of greater economy than the prior art devices and is able to withstand elevated temperatures of 250° F. and pressure of about 150 lbs. per square inch. A short time pressure of up to 900 P.S.I. would probably do no harm.

Figure 2:
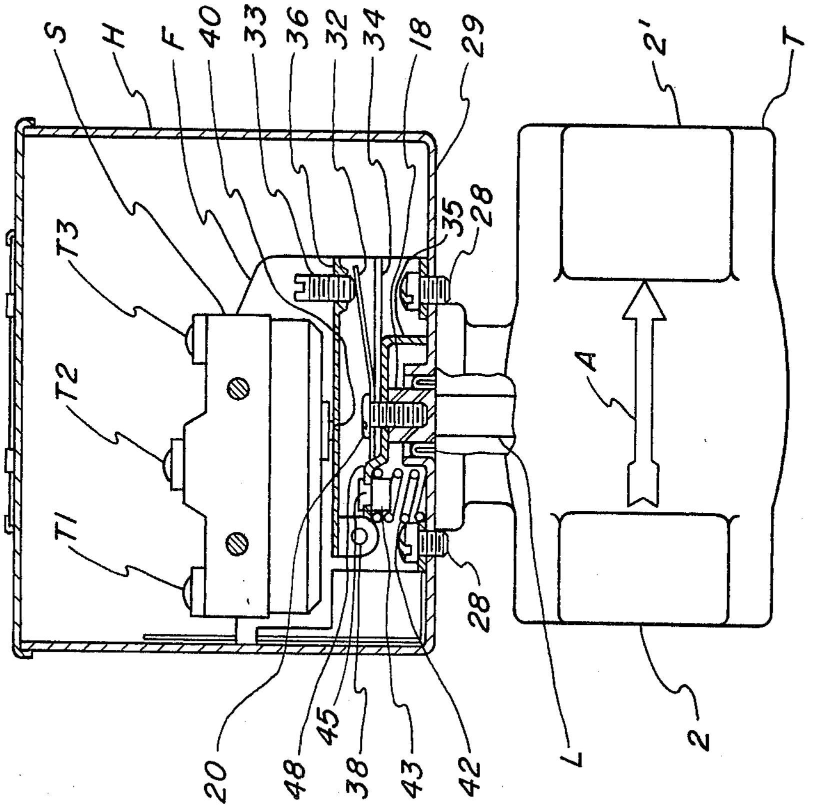
FIG. 2 is a view, partially in section, showing additional details of the embodiment of FIG. 1.

As shown most clearly in FIG. 2, the instrument housing H incorporates a linkage between the lever arm, or actuating arm, L and a switch S to enable electrical connections to indicate the flow of fluid in the T-fitting. Essentially, the switch S provides "on" and "off" indications over terminals T1, T2 and T3 depending upon the flow of fluid through the openings 2–2′ and upon the particular arrangement of switch contacts in the Switch S.

In the condition illustrated in FIG. 1, the metering piston P is shown in its "closed" position, i.e., in contact with the annular opening 6 to indicate a no-flow condition, or a very-low leakage flow, in the direction of arrow A. Under the circumstances, the lever L will be vertical as shown and will exert no forces to be transmitted through the mechanical linkage in the housing H.

When a sufficient force is exerted in the direction A to move the metering piston P, the lever arm L will be rotated counter-clockwise about a fulcrum located at the contact areas between the point F′ on the bracket F (FIG. 1) and an indentation, forming a pivot bearing R′, on the rocker R. This motion of L will cause an actuator plate at 34 and a spring at 32 to rotate counter-clockwise about the point where they are joined to the lever L by the bolt 20. The spring 32, in pressing against the set screw 33, will cause an arm 36 to rotate counter-clockwise about a pivot at 38. This action of arm 36 will depress the switch button at 40 to alter the internal connections of the switch S and thereby change the electrical connections available through terminals T1, T2 and T3. Tension and spacing between the arm 36 and the spring 32 may be adjusted by turning the set screw 33. In a particular example multiple threads in the set screw enable a turn of the set screw through 360° to move the set screw up or down by ⅛ inch relative to the arm 36.

Spring bias for the assembly shown in FIGS. 1 and 2 is provided by a spring at 42 which is held between the base 29 of the housing and the rocker R by a linkage 43, fitted into a hole 45 in the rocker R.

Figure 3:
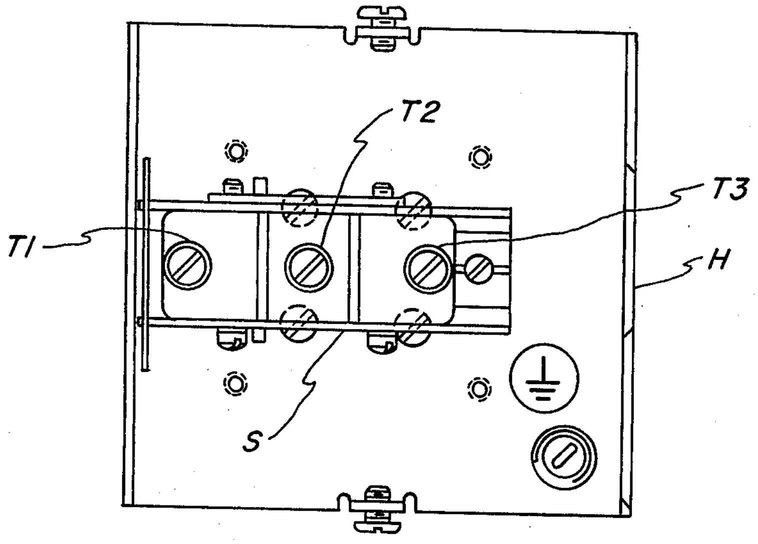
FIG. 3 is a top view of FIG. 2 showing the housing open and the layout for a single microswitch.

FIG. 3 is a top view of a flow switch such as is shown in FIG. 2 with the top cover removed. In this view, a single switch S is shown and the means for activating the switch are hidden beneath the switch.

Figure 4:
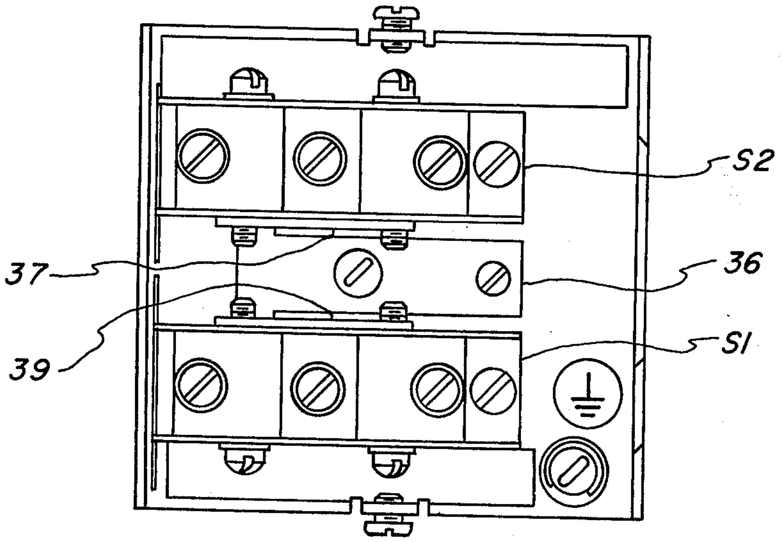
FIG. 4 is a top view showing details of an embodiment of the invention.
Figure 5:
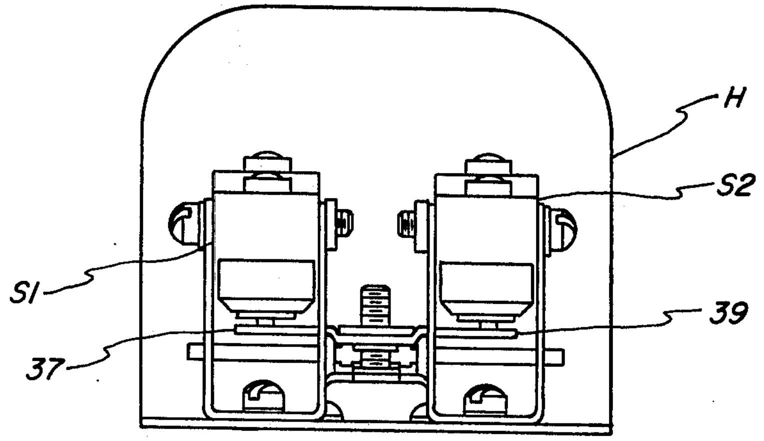
FIG. 5 is a side view in partial section of a portion of the housing of an embodiment of the invention as disclosed in FIG. 4, FIGS. 6*a*–6*d* and 7*a*, 7*b* show details of construction of a bracket providing a pivot for a lever arm.

FIG. 4 is a view of a flow switch showing the layout for operation of two microswitches S1 and S2 with a flow switch according to the invention. In this view, the arm 36 is operated by the mechanical linkage to press each of the elements 37 and 39 against a biased switch element in a microswitch S1 or S2. A further view of this arrangement for operating two microswitches is illustrated in FIG. 5. The particular arrangement provided for controlling two switches simultaneously has proven to be very superior to former approaches, since it permits the uniform application of pressure through a single lever arm to both switches. For operation of two switches in this way, the advantages from use of the improved seal and the improved bearings on the new bracket and rocker are especially noted. With two switches to operate, improved sensitivity through the seal is very necessary. It is also necessary with two switches that alignment between the lever arm, the bearings and the linkages to the switches be kept more accurately than has been possible with the prior art devices, otherwise the switches will not be operated at the same time.

Figure 6A:
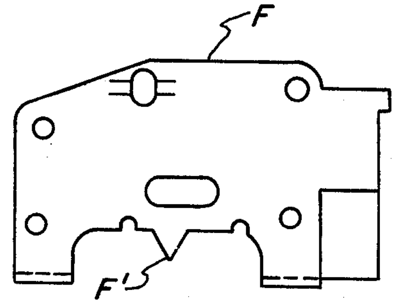
Figure 6D:
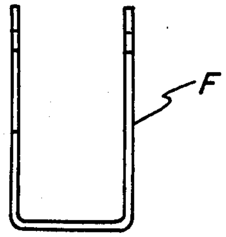
Figure 6B:
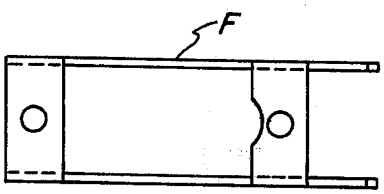
Figure 6C:
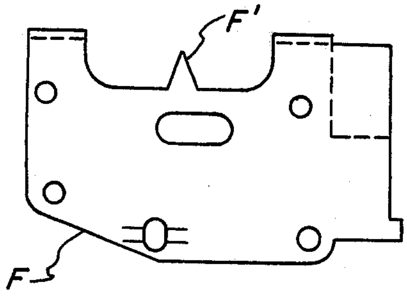

FIG. 6*a* is a view of the stainless steel bracket F, reversed from the view in FIG. 1. FIG. 6*b* is a bottom view of the bracket shown in FIG. 6*a*. These figures show more clearly the relationship of the bearing edge F′ to the bracket F. The edge F′ when assembled together with a receptive indentation R′ as shown in FIG. 1, provides a reference line about which the lever arm L, together with the actuator plate 34 and the spring 32, may pivot. The bottom view of FIG. 6*b* is shown in FIG. 6*c*. A side view of FIG. 6*a* is shown in FIG. 6*d*.

Figure 7A:
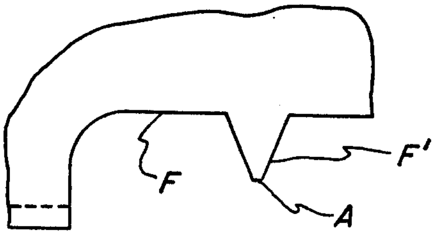
Figure 7B:
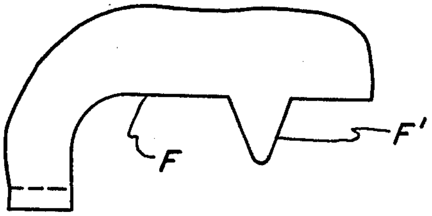

FIG. 7*a* shows details of the bearing edge F′ as it appears before coining operations are applied. In a particular embodiment, the angle between the straight edges of the V was 55° and the apex A was a flattened surface about 0.015 inch across. After coining, as indicated in FIG. 7*b*, the flat apex becomes gently rounded with a radius of about 0.016 inch and with angular relationships as shown, which enable the bearing edge F′ to engage the pivot bearing R′ of the rocker R.

Figure 8A:
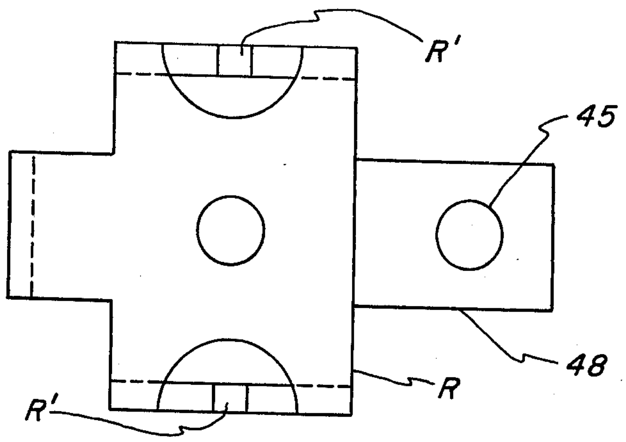
FIGS. 8*a*–8*c* and 9*a*, 9*b* show details of a rocker and pivot bearing according to the invention.
Figure 8B:
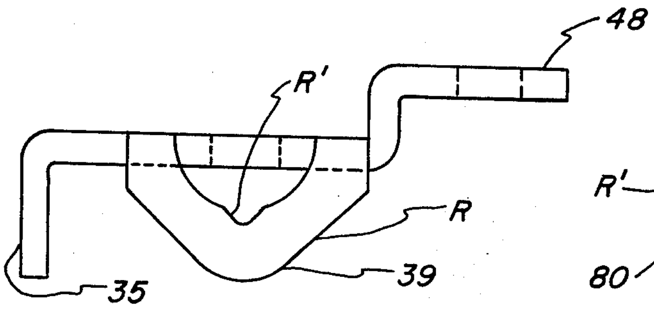
Figure 8C:
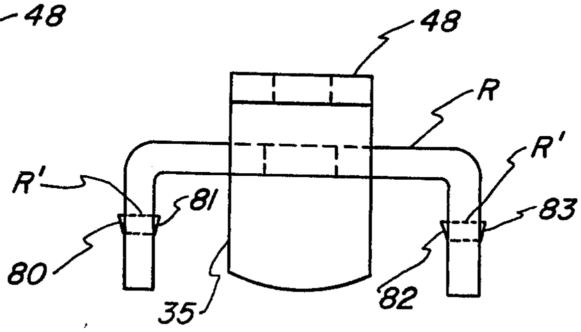

Further aspects of the pivoting arrangements are shown in FIG. 8*a* wherein a pivot bearing at R′ is shown as part of a rocker R, which may preferably be of stainless steel. FIG. 8b is a view from the bottom of FIG. 8*a* showing further details of the formation of the rocker. This view includes a side view of a bearing surface at R′, an extension at 48, a stop 35 and an edge at 39 upon which the rocker may rock as it turns when urged by the lever arm L. FIG. 8*c* is a side view of FIG. 8*b* showing further relationships between the various parts of the rocker. In the view of FIG. 8*c*, lateral displacement of material in the coining operation, thus providing a wider and better bearing surface R′, is indicated at 80, 81, 82, 83.

Figure 9A:
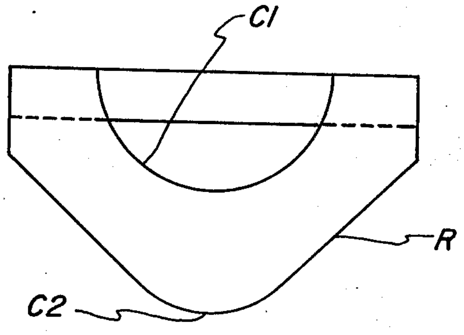
Figure 9B:
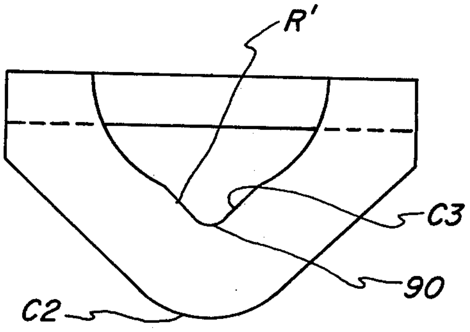

FIG. 9*a* is a view of a portion of a rocker R as it appears in a semi-finished stage before coining of the pivot bearing. FIG. 9*b* shows the appearance of the rocker after the pivot bearing R′ has been made by a coining step. In a particular example, the radius of the curve C1 was about 0.150 inch, the radius of C2 was about 0.130 inch, and the radius of the curve C3 was about 0.020 inch. As best shown in FIG. 9*b*, the coining operation produces a 90° V-shaped indentation, the apex of which provides a bearing surface which blends smoothly as shown at 80 with the straight wall of the V. Coining of the bearing surfaces on the rocker F widens them to enable a better match to be made with the mating bearing surfaces on the bracket. Coining also assures smoother surfaces and harder surfaces which will wear better and maintain better alignment through the bearings between the lever arm and the linkage to the switch. It has been noted in a particular embodiment that the coining operation increased the hardness of all the bearing surfaces from 7 to 9 points. The rocker R is preferably formed of stainless steel, but other material may be used.

FIG. 10 is a sectional view of an exemplary "hat" shaped membrane in its relaxed condition before being used. This membrane is of use in providing a seal between the T-section and the instrument housing in accordance with the present invention. The annular opening at 72 will provide room for the threaded portion 19 of the extension 18 which screws into the end of the lever arm L, or 11, to form a seal. The circular flat portion 74 of the "hat" is secured between the base of the housing H and the end of the T-fitting T (FIG. 1) to complete the seal and prevent fluid from flowing between the respective T-sections and the housing.

While the principles of the invention have been described above in connection with specific apparatus and applications, it is to be understood that this description is made only by way of example and not as a limitation on the scope of the invention.

I claim:

1. In a flow switch adapted to respond operatively to fluid flowing in a pipeline, a housing including a base portion adapted for connection to a pipeline, said base portion including an opening for communication with the interior of a pipeline, first lever means extending through said opening to enable a first end of the lever means to be positioned in the interior of a pipeline and a second end to be positioned within the housing, pressure responsive means supported on said first end of the lever means to establish contact with fluids and move in response to fluid flow, flexible seal means including an outer edge sealed to said base portion, flexible seal means including an opening through a central portion enabling said lever means to extend therethrough and providing a seal preventing fluids from entering said housing, rocker means, including a pivot bearing, coupled to the second end of said lever means to enable motion of said first end to be transmitted by the second end, pivot bearing means integral to a bracket fastened in said housing in engagement with said pivot bearing to provide a fulcrum about which the first lever means may rotate, second lever means fastened at one end to said rocker means, and a switch assembly including a plunger operated switch unit mounted on said bracket, said second lever means responding to motion imparted through said first lever means to the rocker means to operate said plunger.

2. In a flow switch adapted to respond operatively to fluid flowing in a pipeline comprising:

a housing adapted for connection to a pipeline and including a base with an opening for communication with the interior of a pipeline, a bracket connected to said base, said bracket including first bearing means integral therewith, lever means in said housing extending through said opening to establish contact with fluids in said pipeline and respond to fluid flow therein, rocker means movably connected to said lever means, said rocker means including second bearing means in engagement with said first bearing means, said first bearing means and said second bearing means forming a pivot about which the lever means may rotate in response to said fluid flow, and switch means secured in said housing and coupled through coupling means to be operative responsive to motion imparted to said rocker means by rotation of said lever means about said pivot.

3. In a flow switch adapted to respond operatively to fluid flowing in a pipeline, means comprising:

a base adapted for connection to a pipeline and including an opening for communication with the interior of a pipeline, a bracket fastened to said base, said bracket including first bearing means integral therewith, rocker means including second bearing means in engagement with said first bearing means, lever means extending through said opening, pressure responsive means engageable with a first end of the lever means to establish contact with fluids in a pipeline and respond to fluid flow, fastener means securing said rocker means to the second end of said lever means to receive motion from the lever means, said first bearing means and said second bearing means fitting together to form a pivot about which the lever means may rotate, said fastener means securing an actuator plate and spring to said rocker means and causing said actuator plate and spring to be deflected by motion of the lever at an angle of substantially 90° to that of the lever, flexible seal means fastened to the base to prevent fluid from exiting from the pipeline through the opening in the base through which the lever means extends, the flexible seal means enabling the lever means to transmit motion from its first end to its second end, and means mounted on said bracket responsive to motion of the rocker to provide indications of the status of fluid flow, said means mounted on said bracket including at least two electric switches coupled through two elements, an actuator arm and a second spring to assure uniform application of motion to the electric switches from said lever means through the rocker means.

4. In a flow switch adapted to respond operatively to fluid flowing in a pipeline, means comprising:

a base adapted for connection to a pipeline and including an opening for communication with the interior of a pipeline, a bracket fastened to said base, said bracket including first bearing means integral therewith, rocker means including second bearing means in engagement with said first bearing means, lever means extending through said opening, pressure responsive means engageable with a first end of the lever means to establish contact with fluids in a pipeline and respond to fluid flow, fastener means securing said rocker means to the second end of said lever means to receive motion from the lever means, said first bearing means and said second bearing means fitting together to form a pivot about which the lever means may rotate, said fastener means securing an actuator plate and spring to said rocker means and causing said actuator plate and spring to be deflected by motion of the lever at an angle of substantially 90° to that of the lever, flexible seal means fastened to the base to prevent fluid from exiting from the pipeline through the opening in the base through which the lever means extends, the flexible seal means enabling the lever means to transmit motion from its first end to its second end, and means mounted on said bracket responsive to motion of the rocker to provide indications of the status of fluid flow, said means to provide indications of the status of fluid flow including an electric switch assembly incorporating a plunger operated switch unit.

5. In a flow switch as claimed in claim 4, in which the means to provide indications in the switch unit comprises an actuator arm and a second spring secured to said rocker, said arm pivoted to the bracket in a manner enabling it to engage the plunger, and a set screw adjustable in said arm engaging said spring and altering the tension on said spring to thereby vary the force required to operate said plunger.

6. In a flow switch as claimed in claim 5, in which the switch assembly includes two plunger operated switch units, and the arm pivoted to the bracket is coupled through two elements to separately engage the plungers of the two switch units.

7. In a flow switch means adapted to respond operatively to fluid flowing in a pipeline comprising:

a base adapted for connection to a pipeline and including an opening for communication with the interior of a pipeline, first bearing means forming part of an integral unit connected to said base, second bearing means in engagement with said first bearing means, pressure responsive means coupled to said second bearing means to establish contact with fluids in a pipeline and respond to fluid flow, said first bearing means and said second bearing means forming a pivot about which the pressure responsive means may rotate, a bracket fastened to said base, and means mounted on said bracket to provide indications of the status of fluid flow, including at least two electric switches coupled through two elements, an actuator arm and a spring to assure uniform applications of motion to the electric switches from said lever means through the rocker means.

* * * * *